United States Patent [19]

Dvir et al.

[11] Patent Number: 5,447,743

[45] Date of Patent: Sep. 5, 1995

[54] HONEY-BASED FOOD PRODUCT

[75] Inventors: Avraham Dvir; Nitzan Israeli, both of Hof Ashkelon; Nitzan Shlissel; Avi Kurnas, both of Tel-Aviv, all of Israel

[73] Assignee: Yad Mordechai Apiary, Israel

[21] Appl. No.: 367,461

[22] Filed: Jan. 10, 1995

Related U.S. Application Data

[63] Continuation of Ser. No. 76,977, Jun. 16, 1993, abandoned.

[30] Foreign Application Priority Data

Jun. 17, 1992 [IL] Israel ........................... 102229

[51] Int. Cl.⁶ ............................................. A23L 1/08
[52] U.S. Cl. .................................. 426/658; 426/804
[58] Field of Search ............... 426/632, 302, 309, 658, 426/804

[56] References Cited

U.S. PATENT DOCUMENTS

| | | | |
|---|---|---|---|
| 3,622,349 | 11/1971 | Mitchell et al. | 426/577 |
| 4,161,545 | 7/1979 | Green | 426/632 |
| 4,647,463 | 3/1987 | Hoover | 426/632 |
| 4,828,858 | 5/1989 | Holloway et al. | 426/632 |
| 4,910,028 | 3/1990 | Bernacchi et al. | 426/632 |

FOREIGN PATENT DOCUMENTS

| | | |
|---|---|---|
| 75112 | 5/1985 | Israel . |
| 56-160964 | 12/1981 | Japan . |
| 59-213369 | 12/1984 | Japan . |
| 1320959 | 12/1989 | Japan . |

OTHER PUBLICATIONS

Abstract: "Quality of Commercial Honey", No. 129689t, Ishiguro, Isao et al., C.A. vol. 73, 1970, p. 259.
Abstract: "Multotriltol content of low calorie foods containing hydrogenated maltose syrup", No. 22094p, Tsuda, Akiko et al., National Institute Nutri., Tokyo, Japan, C.A. vol. 107, 1987, p. 500.

*Primary Examiner*—Jeanette Hunter
*Attorney, Agent, or Firm*—Wigman, Cohen, Leitner & Myers

[57] ABSTRACT

A honey-based food product having a taste and texture resembling that of pure honey while having a substantially lower calorie content, containing honey, a water soluble low-calorie polysaccharide and a polyalcohol.

19 Claims, No Drawings

HONEY-BASED FOOD PRODUCT

This is a continuation of application Ser. No. 08/076,977 filed on Jun. 16, 1993, abandoned.

FIELD OF THE INVENTION

The present invention is generally in the field of low calorie food products and more specifically is directed to a low calorie honey-based food product.

BACKGROUND OF THE INVENTION

With people's ever growing concern regarding their calorie intake, there is an increasing demand for low calorie food products. Natural honey, having 320 Kcal per 100 gms, is a delicacy avoided by many due to its relatively high calorie content. Various attempts to produce low calorie honey were unsucessful due to the unnatural texture and unpalatable taste of such products.

It would have been highly desirable to have a food product which has a taste and consistency of honey and a calorie content which is substantially lower than that of natural honey. It is the object of the invention to provide such a food product and a method for producing same.

GENERAL DESCRIPTION OF THE INVENTION

In accordance with the present invention, a honey-based food product is provided having a texture and taste which are essentially similar to those of natural honey, whilst having a substantially lower calorie content.

Thus, the present invention provides a honey-based food product consisting essentially of honey, a water soluble low-calorie polysaccharide and a polyalcohol, the concentration of the various ingredients being such that the food product has a taste and texture resembling that of pure honey while having a substantially lower calorie content.

The honey in the food products of the present invention can be any natural bee honey such as citrus honey, i.e. produced from nectar of citrus flowers, eucalyptus honey, wild flower honey, sunflower honey, and others, or a combination of several types of honey.

The water soluble low-calorie polysaccharide is typically a polymer or copolymer made of monomers such as glucose or fructose which have a calorie content substantially lower than 4 Kcal/gm. An example of a water soluble low-calorie sugar polymer is polydextrose, which is a polymer of α-D-glucose and is not fully assimilable by the body and thus does not substantially contribute to the calorie content of the product. An example of polydextrose is that marketed by Pfizer (U.S.A.) under the trade name LITESSE TM.

The polyalcohols can be polyalcohols derived from pentoses or hexoses known in the art. Polyalcohols are only partially absorbed by the body and thus in general have a calorie content of about 2.4 Kcal/gm. Examples of polyalcohols are sorbitol, maltitol, maltotritol, xylitol, manitol, galactitol, or a combination thereof.

In the following description, concentration of ingredients will be given as "%", meaning weight of ingredient per 100 weight units of entire product.

The various ingredients may have the following concentrations:

honey—about 10% to 50%, preferably 30% to 40%;
soluble low-calorie polysaccharides—about 10% to 70%, preferably about 20% to 30%;
polyalcohol—about 1% to 50%, preferably about 25% to 35%.

All the above concentrations should be understood as standing each by itself.

Pure honey has a calorie value of about 3.2 Kcal/gr, whereas the polysaccharides and the polyalcohols have calorie values of about 1 and 2.4 Kcal/gr, respectively.

The honey-based food product of the present invention does not require any additional ingredients beyond those mentioned above, although water may at times be added to complete the weight to 100%.

It desired, various other ingredients such as densifiers can be added for the purpose lowering the calorie content while maintaining the food product's honey-like texture. Examples of densifiers are maltodextrene, arabic gum, carboxymethylcellulose (CMC), dietary fibers and other ingredients known in the art for their ability to increase volume or to contribute to the consistency of food products without substantially contributing to their calorie contents.

The food product of the present invention generally resembles honey in its taste and texture so that flavor additives, stabilizers or preservatives are often not required.

The present invention further provides a method for the preparation of said honey-based food product. The method comprises:
(a) mixing the polysaccharides and the polyalcohols;
(b) stirring the mixtures, e.g. at a high speed, until a substantially homogenized mixture is obtained; and
(c) adding pure honey to said homogenized mixture while stirring, e.g. at low speed.

DETAILED DESCRIPTION OF THE INVENTION

The invention will now be illustrated by the following description of several non-limiting specific embodiments.

Preparation of the honey-like food product 23 kg of powdered sorbitol (Frutarom, Israel) and 136 kg of polydextrose (LITESSE TM, Pfizer Inc., U.S.A.) in the form of "low dust" was gradually added to 222 kg of a 70% sorbitol in water solution. The mixture was stirred in an ULTRA-TURAX TM homogenizer (Kunkel Kt. Ika-Werk, Germany) set at a speed of 3000 RPM at room temperature for one hour. During the stirring, the temperature of the mixture using rises to about 60° C. The mixture was left overnight at a temperature of 70° to 80° C. in order to enable all the air bubbles to escape. Before addition of the honey, the mixture was cooled to 40° C. in order to avoid caramelization of the honey's sugars and denaturation of the honey's proteins. 196 kg of honey was then added to the mixture, and was gently mixed in a conventional industrial mixer at a speed of 25 rpm.

The honey-based food product thus obtained consisted of the following:

Formulation I honey—34%
sorbitol—30%
polydextrose—24%
water—12%

In the same manner, honey-based food products of the following formulations were prepared:

Formulation II honey—40%
sorbitol—20%
polydextrose—24%
water—16%

Formulation III honey—50%
sorbitol—2%
polydextrose—40%
water—8%

ANALYSIS OF THE PRODUCT OF FORMULATION I

Chemical analysis

| Parameter | Food product of the invention | Pure honey |
| --- | --- | --- |
| caloric content | 200 Kcal/100 gr | 320 Kcal/100 gr |
| pH | 3.4–3.6 | 3.4–4.2 |
| Brix degree (at 20° C.) | 80%–82% | >80% |

Stability tests

The honey-based food product described above was kept at 37° C. for more than six months. The Brix degrees and pH remained the same. No crystallization or phase separation was evident.

Taste tests

The honey-based food product prepared as described above was tested in a two-step tasting test. The first step was a blind test where the honey-based food product was compared to pure citrus honey without the tasters being aware of the fact that one sample was not pure honey. The second step was an open test where the tasters gave their absolute evaluation of the honey-based food product after being informed of its nature.

RESULTS

Blend Test

Number of tasters: 17

| Parameter | Food product of the invention | Citrus honey |
| --- | --- | --- |
| taste | almost very good | good − |
| appearance | good + | good + |
| smell | good + | good − |
| after taste | good + | good − |
| sweetness: | | |
| as should be | 65% | 47% |
| too sweet | 18% | 35% |
| not sweet enough | 17% | 18% |
| texture: | | |
| as should be | 88% | 53% |
| too thick | — | — |
| too thin | 12% | 41% |
| no opinion | — | 6% |
| color: | | |
| as should be | 53% | 41% |
| too light | 47% | 35% |
| too dark | — | — |
| no opinion | — | 24% |
| satisfaction | good + | good − |
| preference | 81% | 19% |

As can be seen by the results of the blind test, the honey-based food product of the present invention achieves better results than pure honey in almost every parameter, and is actually preferred by 81% of tasters over natural honey.

Open Test

Number of tasters: 17

| taste | almost very good |
| --- | --- |
| appearance | almost very good |
| smell | good + |
| after taste | good + |
| sweetness: | |
| as should be | 71% |
| too sweet | 17% |
| not sweet enough | 12% |
| texture: | |
| as should be | 82% |
| too thick | — |
| too thin | 18% |
| color: | |
| as should be | 71% |
| too light | 29% |
| too dark | — |
| satisfaction | good + |

The highly pleasing results of the honey-based food product of the invention were confirmed also by the open test.

We claim:

1. A honey-based food product comprising, by weight, about 10–70% polysaccharide, about 1–50% polyalcohol, and honey to about 100%.

2. The food product of claim 1, wherein the honey concentration is about 10% of 50% by weight.

3. The food product of claim 2, wherein the honey concentration is about 30% to 40% by weight.

4. The food product of claim 1, wherein the concentration of the soluble low-calorie saccharide is about 20% to 30% by weight.

5. The food product of claim 1, wherein the concentration of the polyalcohol is about 25% to 35% by weight.

6. The food product of claim 1, wherein the water soluble low-calorie polysaccharide is polydextrose.

7. The food product of claim 1, wherein the polyalcohol is an alcohol derived from pentoses or hexoses.

8. The food product of claim 1, wherein the polyalcohol is sorbitol.

9. The honey-based food product as in claim 1, wherein said honey concentration is about 30% to 40%; said polysaccharide is about 20 to 30%; and said polyalcohol is about 25 to 35%.

10. The honey-based food product as in claim 9, wherein said polyalcohol is selected from the group consisting of sorbitol, maltitol, maltotritol, xylitol, manitol, galactitol, and a combination thereof.

11. The honey-based food product as in claim 10, wherein said polysaccharide is polydextrose.

12. The honey-based food product of claim 1, further comprising about 8–20% water.

13. The honey-based food product as in claim 12, comprising the following formulation:
honey—34%
sorbitol—30%
polydextrose—24%
water—12%.

14. The honey-based food product as in claim 12, comprising the following formulation:
honey—40$ sorbitol—20%
polydextrose—24%
water—16%.

15. The honey-based food product as in claim 12, comprising the following formulation:
honey—50%
sorbitol—2%
polydextrose—40%
water—8%.

16. A method for producing a honey-based food product comprising the steps of:
(a) mixing a water soluble low-calorie polysaccharide and a polyalcohol;
(b) stirring the mixture at a speed which is effective to produce a substantially homogenized mixture; and
(c) adding pure honey to said homogenized mixture while stirring at a speed lower than the speed of step (b).

17. The method of claim 16, wherein the speed of step (b) is about 3000 rpm.

18. The method of claim 16, wherein the speed of step (c) is about 25 rpm.

19. The method of claim 16, wherein the speed of step (b) is about 3000 rpm and the speed of step (c) is about 25 rpm.

* * * * *